United States Patent [19]
Hollins

[11] 3,863,209
[45] Jan. 28, 1975

[54] VEHICLE SEAT BELTSTARTER MOTOR INTERLOCK AND SEQUENTIAL WARNING SYSTEM

[76] Inventor: Jesse R. Hollins, 40 Stoner Ave., Great Neck, N.Y. 11021

[22] Filed: Nov. 3, 1972

[21] Appl. No.: 303,495

Related U.S. Application Data

[63] Continuation-in-part of Ser. No. 295,506, Oct. 6, 1972, abandoned, which is a continuation-in-part of Ser. No. 230,678, March 1, 1972, abandoned.

[52] U.S. Cl. ........... 340/52 E, 340/278, 307/10 SB, 180/82 C, 200/61.58 B
[51] Int. Cl. ............................................. B60r 21/10
[58] Field of Search ...... 340/52 D, 52 E, 52 F, 278; 307/10 SB; 180/82 C, 101; 200/61.58 B

[56] References Cited
UNITED STATES PATENTS

| | | | |
|---|---|---|---|
| 3,340,523 | 9/1967 | Whitman | 340/52 E X |
| 3,506,305 | 4/1970 | Eineman, Jr. et al. | 340/52 E X |
| 3,737,850 | 6/1973 | Kopp | 340/278 X |
| 3,740,711 | 6/1973 | Bell | 340/52 E |

*Primary Examiner*—Alvin H. Waring

[57] ABSTRACT

A vehicle seat belt starter motor interlock and sequential warning system including a source of electrical power. An ignition switch is provided and includes an ignition "on" terminal, a switch "off" terminal and an engine cranking motor terminal. Means electrically connects the source of power to either of said ignition "on" and switch "off" terminals or simultaneously to said ignition "on" and engine cranking motor terminal. A seat belt assembly includes a retractable belt. A warning means is provided as is an engine starting motor solenoid. The warning means is activated when the source of power is electrically connected to the switch "off" contact terminal and the belt is unretracted and is deactivated when the seat belt is retracted. The engine cranking motor terminal is connected to the engine motor solenoid only when the seat belt is unretracted.

9 Claims, 6 Drawing Figures

Patented Jan. 28, 1975

VEHICLE SEAT BELT STARTER MOTOR INTERLOCK AND SEQUENTIAL WARNING SYSTEM

CROSS REFERENCE TO RELATED APPLICATIONS

This application is a continuation-in-part of my copending patent application filed Oct. 6, 1972 for "VEHICLE SEAT BELT WARNING SYSTEM" and bearing Ser. No. 295,506 now abandoned. Patent application Ser. No. 295,506 is a continuation-in-part of my earlier copending application filed Mar. 1, 1972 for "VEHICLE SEAT BELT WARNING SYSTEM" and bearing Ser. No. 230,678 now abandoned.

BACKGROUND OF THE INVENTION

1. Field of the Invention

Vehicle seat belt starter motor interlock and sequential warning system

2. Brief Description of the Prior Art

With increased attention being directed towards reducing motor vehicle fatalities, federal highway safety regulations require automobile manufacturers to equip their vehicles with seat belts for both the driver and the outboard passenger on the front seat. In order to ensure that use is made of the seat belts for the driver and outboard passenger, the regulations now require that a warning device is sounded if the seat belt is not extended by the driver and/or outboard passenger when the ignition switch movable arm is at the ignition "on" position and the gear shift member is in a vehicle movement position. As a further means of ensuring that use is made of the seat belt for the driver, it is desirable that the driver of a vehicle not be capable of starting the vehicle engine unless his seat belt is extended.

Many automobile manufacturers provide an electrical circuit which is activated or deactivated depending on whether a retractable belt of the seat belt assembly is or is not retracted. Retraction of the belt with the ignition switch movable arm at the ignition "on" position and the shift member in a position to enable the vehicle to move activates a switch that causes a warning device such as a buzzer or flashing light or both to be activated. As soon as the retractable belt is extended, as for example when the seat belt is located about the torso of the occupant, the warning device is deactivated. Unfortunately, since the warning device is deenergized when the belt is extended more than a predetermined amount from the retractor the system can be permanently defeated by permanently fixing a partially extended retractable seat belt so that the same cannot be retracted, such as by wedging the retractable seat belt between the horizontal and vertical seat cushions, by engaging a fixed and retractable belt without the same being looped about a person or in some other makeshift manner.

SUMMARY OF THE INVENTION

1. Purposes of the Invention

It is an object of this invention to provide a vehicle seat belt starter motor interlock and sequential warning system which cannot be circumvented unless the electrical circuits therefor are disconnected or destroyed.

Other objects of the invention will in part be obvious and in part will be pointed out hereinafter.

2. Brief Description of the Invention

According to the present invention, a vehicle seat belt starter motor interlock and sequential warning system is provided which includes a conventional automobile battery, an ignition switch and a seat belt assembly having a retractable belt. The ignition switch includes an ignition on terminal, a switch off terminal and an engine cranking motor terminal. A first terminal of a two terminal snap action switch is connected to the ignition on terminal. The second terminal of the snap action switch is connected to the switch off terminal of the ignition switch. The snap action switch contact blade is connected to a warning device. The engine cranking motor terminal is connected to the first terminal of an engine cranking motor control switch. The second terminal of the engine cranking motor control switch is connected to the engine cranking motor solenoid. Means is provided for placing the snap action switch contact blade in circuit with the snap action switch first terminal and for moving the engine cranking motor switch control first terminal out of contact with the engine cranking motor switch control second terminal when the seat belt is fully retracted. With the seat belt extended, the terminals of the engine cranking motor control switch are in contact and the switch contact blade contacts the switch second terminal.

If the ignition switch movable arm is at the switch off position and the seat belt is extended, electrical energy from the battery is connected through the switch off terminal to the second terminal of the snap action switch to the warning device which is activated. With the ignition switch movable arm at the switch off position, retraction of the seat belt deenergizes the warning device.

If the ignition switch is in the engine cranking motor position and the seat belt is retracted, the contact blade of the snap action switch makes contact with the first terminal thereof and the warning device is activated. The engine cannot be started since with the seat belt in the retracted position the engine cranking motor switch is open. As soon as the seat belt is extended, the contact blade makes contact with the second terminal of the snap action switch and the warning device is no longer activated. Additionally, the engine cranking motor switch closes enabling the battery through the ignition switch engine cranking motor terminal to be connected to the engine cranking motor solenoid to cause the cranking motor to run and crank the engine.

Other embodiments of the invention are hereinafter described.

The invention accordingly consists in the features of construction, combinations of elements, and arrangements of parts which will be exemplified in the vehicle seat belt starter motor interlock and sequential warning systems hereinafter described and of which the scope of application will be indicated in the appended claims.

DESCRIPTION OF THE PREFERRED EMBODIMENTS

Figure 1:
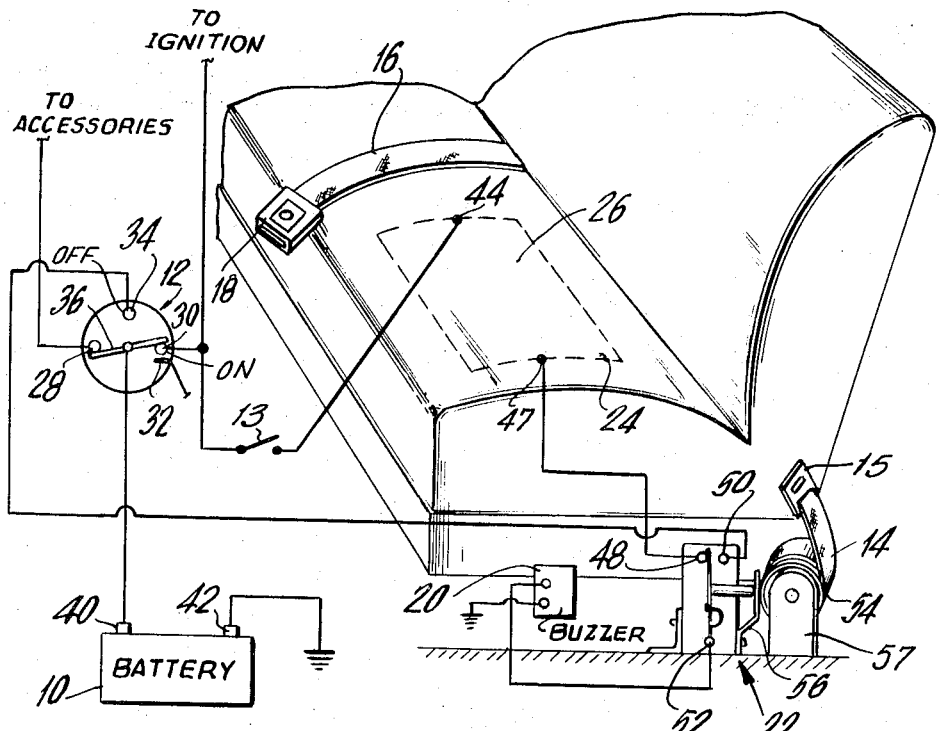
FIG. 1 is a schematic illustration of a first system with the seat belt retracted.
Figure 2:
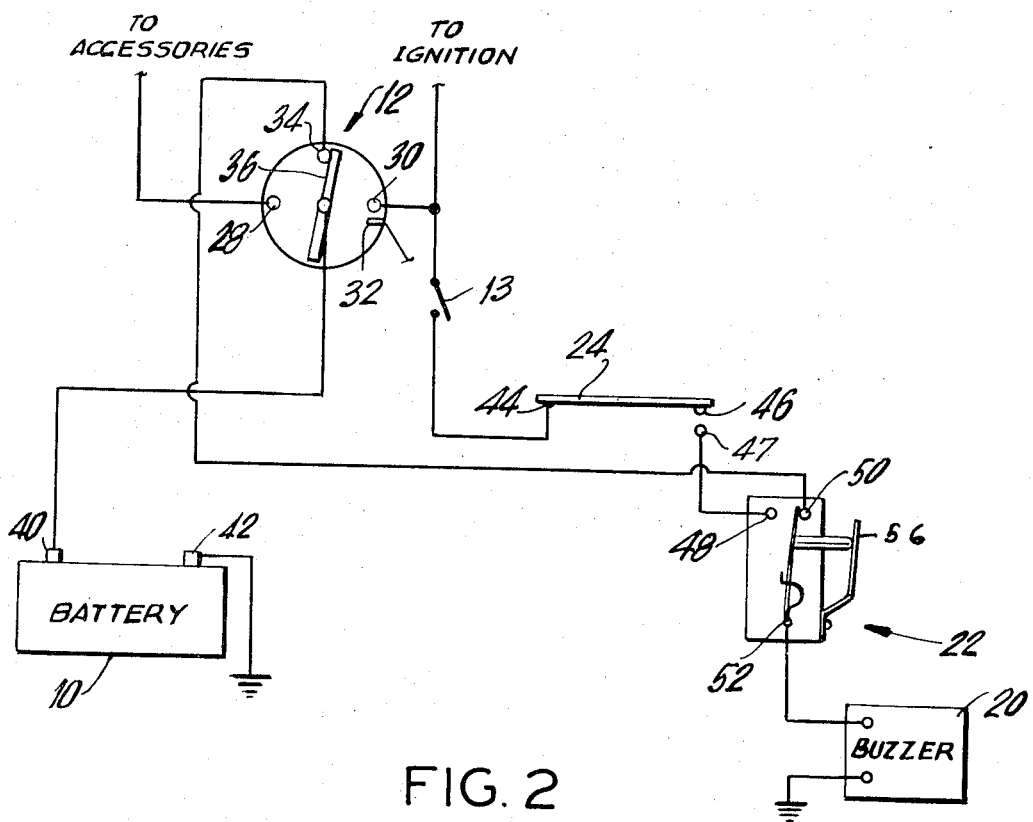
FIG. 2 is a simplified schematic diagram of the circuitry for the first system when the seat belt is extended.

The first system of the invention shown in FIGS. 1 and 2 includes components of the vehicle such as an automobile battery 10, an ignition switch 12 and a transmission shift member sensing switch 13. Switch 13 is a conventional switch found in automobiles which is closed when the vehicle transmission is positioned so as to move the vehicle. Additionally, the system includes a retractable driver seat belt 14 with a buckle half 15 and a driver fixed belt 16 having a buckle half 18. The system also includes a seat belt retraction sensing means which includes a snap action single pole double throw switch means 22.

A warning device 20 can be any type of audible mechanism such as a buzzer. Alternatively, a visual mechanism might be used such as a pilot light mounted in a position visible to the vehicle driver. Further, the warning device could consist of a combination of both audio and visual mechanisms such as mentioned above. Additionally, a load sensitive, normally open, momentary switch 24 is installed within a seat 26 on the driver side thereof as shown in FIG. 1 in a position such that the normally open terminals of the switch close when the vehicle occupant is sitting on seat 26 and open when the seat is unoccupied.

Ignition switch 12 has four indicated terminals, normally an accessory terminal 28, an ignition on terminal 30, an engine cranking motor terminal 32, a switch off terminal 34 and a movable contact arm 36. The ignition switch is in the switch off position when movable arm 36 is in contact with terminal 34.

Movable contact arm 36 is electrically connected to the hot terminal 40 of battery 10. The remaining terminal 42 of battery 10 is electrically connected to circuit ground (the automobile chassis). Movable arm 36 makes electrical contact with terminal 30 and accessory terminal 28 simultaneously in the ignition on position of movable arm 36. The ignition on terminal 30 is connected via transmission shift member sensing switch 13 to terminal 44 of load sensitive switch 24. Switch 13 is closed when the vehicle shift member is in a position to move the vehicle. The remaining terminal 46 of load sensitive switch 24 is electrically connected via a terminal 47 to a fixed terminal 48 of switch means 22 when load sensitive switch 24 is closed. Switch off terminal 34 of ignition switch 10 is electrically connected to another fixed terminal 50 of switch means 22. Switch means 22 includes a spring biased movable arm 52 that is electrically connected to one terminal of warning device 20. Arm 52 is biased against terminal 50 and is electrically connected to terminal 48 in a manner that will hereinafter be described. The other terminal of warning device 20 is electrically connected to circuit ground.

Seat belt retraction sensing means is provided by a spiral 54 formed by the retraction of belt 14 and a switch control element such as a cantilever switch leaf 56 which bears against the spiral and the push button of switch means 22. The non-buckle half end of belt 14 is fastened to a standard spring loaded retractable shaft assembly which is anchored to the floor. When belt 14 is fully retracted the spiral is of maximum diameter and presses against cantilever switch leaf 56 causing the push button of switch means 22 to swing movable arm 52 into contact with terminal 48. When seat belt 14 is pulled or extended to a partially unretracted position, the size of spiral 54 decreases permitting switch leaf 56 to release pressure on the push button and permit spring biased movable arm 52 to snap against terminal 50 of switch means 22. The point at which arm 52 is snapped against terminal 50 is selected by the vehicle manufacturer as determined by safety standards; it usually conforms to about four inches of withdrawal of the belt from the spiral. The point at which arm 52 snaps against terminal 48 occurs at slightly less than a four inch withdrawal of the belt.

The operation of the system will now be explained. As soon as a vehicle driver sits on seat 26, his body weight causes load sensitive switch 24 to close so that terminals 46 and 47 are electrically connected to each other. When the ignition switch movable arm contacts ignition on terminal 30 and if transmission mode selector switch 13 is closed, with seat belt 14 still retracted, movable arm 52 is in contact with fixed terminal 48 of switch means 22. Electrical current flows from battery 10 via terminal 48 and arm 52 to warning device 20. The warning device is thus activated alerting the vehicle driver that he has not fastened his seat belt. The alerting device 20 remains on until belt 14 is withdrawn far enough out of the retractor assembly such as by being placed about the torso of the occupant thus causing movable arm 52 to become electrically disconnected from fixed terminal 48 and electrically connected to terminal 50 of switch means 22 thereby shutting off the flow of current to warning device 20 and deactivating the warning device.

If at any time while the driver is sitting in seat 26 with the ignition switch movable arm in contact with ignition on terminal 30 with switch 13 closed and belt 14 is disengaged from belt 16 so as to be in the retracted position, the current to the warning device is re-established and the warning device is again activated.

When the ignition switch is turned so that movable arm contacts switch off terminal 34 and belt 14 is still unretracted so that movable arm 52 is in electrical contact with terminal 50 of switch means 22, electric current will flow from battery 10 through movable arm 36 and switch off terminal 34 of ignition switch 12, terminal 50 and movable arm 52 of switch means 22 to warning device 20, thus activating the warning device and alerting the driver that belt 14 has not yet been retracted. Once belt 14 is allowed to retract so that the increased size of spiral 54 causes movable arm 52 to be electrically disconnected from terminal 50 and electrically connected to terminal 48 of switch means 22 current ceases to flow between terminal 50 and movable arm 52, thus deactivating warning device 20.

It is therefore seen that the warning device is activated whenever the ignition switch movable arm contacts the ignition on terminal, switch 13 is closed and the driver on the seat has not withdrawn belt 14 to an unretracted position. The warning device is also activated when the ignition switch movable arm contacts the off terminal if belt 14 has not been retracted. Thus, the vehicle occupant cannot simply continuously disable the warning device by placing belt 14 permanently in an extended position. By wedging belt 14 between the horizontal and vertical seat cushions, or by other means for maintaining belt 14 in its extended position, the warning device would be activated when the ignition key is turned to the switch off position, thus requiring the vehicle driver to allow belt 14 to retract every time the ignition switch is turned to the switch off position in order to deactivate the warning device and prevent the discharge of the battery.

Accordingly, the vehicle driver, instead of continuously bypassing the now existing warning system, would resign himself to fastening his seat belt when the ignition switch is in the ignition on position and unfastening his seat belt and returning the belt into its retractor when the ignition switch is turned to the switch off position, thereby insuring that the seat belt is properly used.

If desired, the use of switch 13 can be eliminated and terminal 30 can be directly connected to terminal 44.

Switch means 22 can be operated in a manner such that its circuit operation is cam controlled from the shaft of the belt retractor assembly, rather than by spiral 54 of belt 14. Also, switch means 22 can be replaced by two separate single pole switches, each switch being activated or deactivated in accordance with its circuit operation requirements. Likewise, one warning device will be activated when the ignition switch is in the switch off position and belt 14 is unretracted, and another warning device will be activated when the ignition switch is in the ignition on position with switch 13 closed and belt 14 is retracted. If desired, each warning device can be distinctive.

Figure 3:
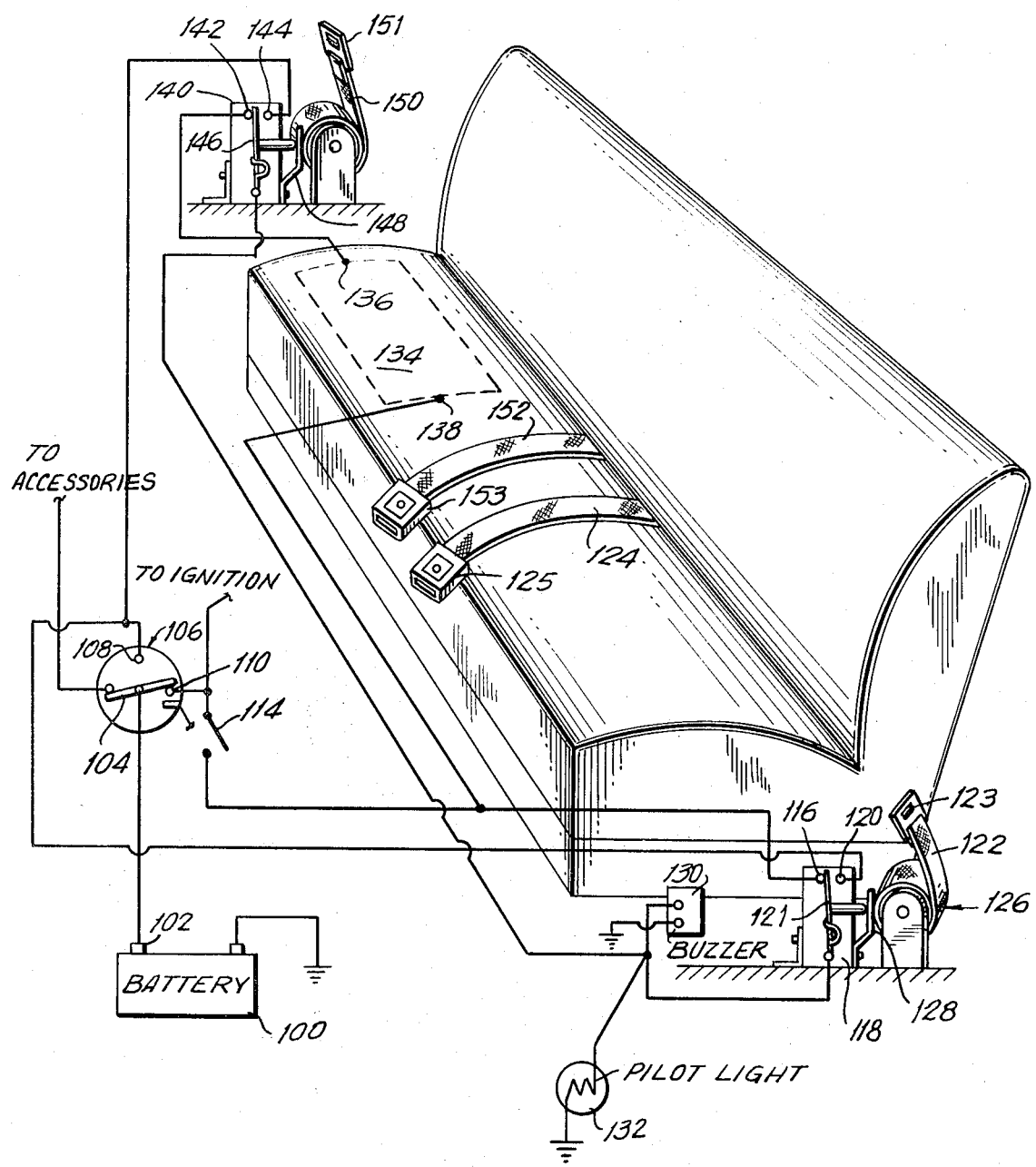
FIG. 3 is a schematic illustration of a second system.

In FIG. 3 of the drawings a further warning system according to the present invention is illustrated and includes a battery 100. The hot terminal 102 of battery 100 is connected to movable contact arm 104 of ignition switch 106. Ignition switch 106 is identical to the ignition switch disclosed in FIGS. 1 and 2 and thus a description of ignition switch 106 is not required for an understanding of the second embodiment of the present invention. Ignition on terminal 110 of ignition switch 106 is connected via a shift member sensing switch 114 to terminal 116 of switch means 118. Switch means 118 is identical to switch means 22 and includes a second terminal 120 and movable arm 121 which is biased against terminal 120. A driver side seat belt assembly includes a retractable belt 122 having a buckle half 123 and a fixed belt 124 with buckle half 125. A spiral 126 is formed by the retraction of belt 122 and a cantilever switch leaf 128 contacts the spiral. Terminal 120 is connected to ignition switch off terminal 108. Cantilever switch leaf 128 controls the operation of switch 118 in the same manner that the operation of switch means 22 is controlled as described in connection with FIGS. 1 and 2. Movable arm 121 is in circuit with one terminal of a warning device 130 with the other terminal of said warning device being connected to circuit ground. Also in circuit with movable arm 121 is a pilot light 132 which is grounded.

A normally open load sensitive momentary switch 134 is located in the passenger side of the front vehicle seat and includes terminals 136 and 138. Terminal 138 is connected to terminal 116 of switch means 118. A passenger side switch means 140 identical to switch means 22 and 118 is provided and includes fixed terminals 142 and 144. Terminal 136 of load sensitive switch 134 is connected to terminal 142 of switch means 140. Switch means 140 includes a movable arm 146 and is biased against terminal 144. A cantilever switch leaf 148 is identical to cantilever switch leaves 56 and 128 moves movable arm 146. A retractable seat belt 150 including a buckle half 151 is provided for the passenger on the front seat as is a fixed belt 152 having a buckle half 153. The structure for controlling operation of switch means 140 in respect to extension or retraction of belt 150 is identical to that in connection with controlling switch means 118 and switch means 22. Movable arm 146 of switch means 140 is electrically connected to movable arm 121 of switch means 118 and to warning device 130. Terminal 144 is connected to the ignition off terminal.

In using the system of the present invention shown in FIG. 3, if an outboard passenger sits on the front seat, switch 134 is closed. If the ignition switch movable arm contacts the switch off terminal and seat belt 150 is retracted, warning device 130 is inactive since movable arm 146 is out of contact with terminal 144 so that no current will flow to warning device 130 or the pilot light.

If the outboard passenger extends his seat belt from the fully retracted position with the ignition switch movable arm at the switch off position, warning device 130 is activated by current from battery 100 flowing through terminal 108, terminal 144 and movable arm 146 to the warning device and pilot light. As soon as the ignition is turned on, warning device 130 and the pilot light are no longer activated as a result of the passenger seat belt being fully extended. This is because with the ignition on and the passenger seat belt fully extended and switch 134 closed movable arm 146 contacts terminal 144 and no potential is supplied to warning device 130 and the pilot light from battery 100 through switch means 140. With the ignition on, and switches 134 and 114 closed, if the passenger seat belt is retracted, movable arm 146 contacts terminal 142 and current flows to warning device 130 and the pilot light from terminal 136 of load sensitive switch 134 which is electrically coupled to battery 100.

When the ignition switch movable arm is at the switch off position, the extended seat belt 122 causes actuation of warning device 130 and the pilot light while the retracted seat belt causes deactivation of the same. When the ignition is turned on, with switch 114 closed and seat belt 122 fully retracted, movable arm 121 contacts terminal 116 and current flows to warning device 130 and pilot light. When belt 122 is extended, movable arm 121 contacts terminal 120 and no current is directed to warning device 130 and the pilot light as a result of belt 122 being extended.

It is noted that in the FIG. 3 system of the present invention there is no requirement that a load sensitive switch be located on the driver side of the front seat since the presence of the driver is sensed when the driver turns the ignition on. However, such a switch may be used and placed in series between terminals 110 and 116 if desired. Here, too, the use of switch 114 may be eliminated and terminal 110 can be directly connected to terminal 116 or to the load sensitive switch if one is used.

Figure 4:
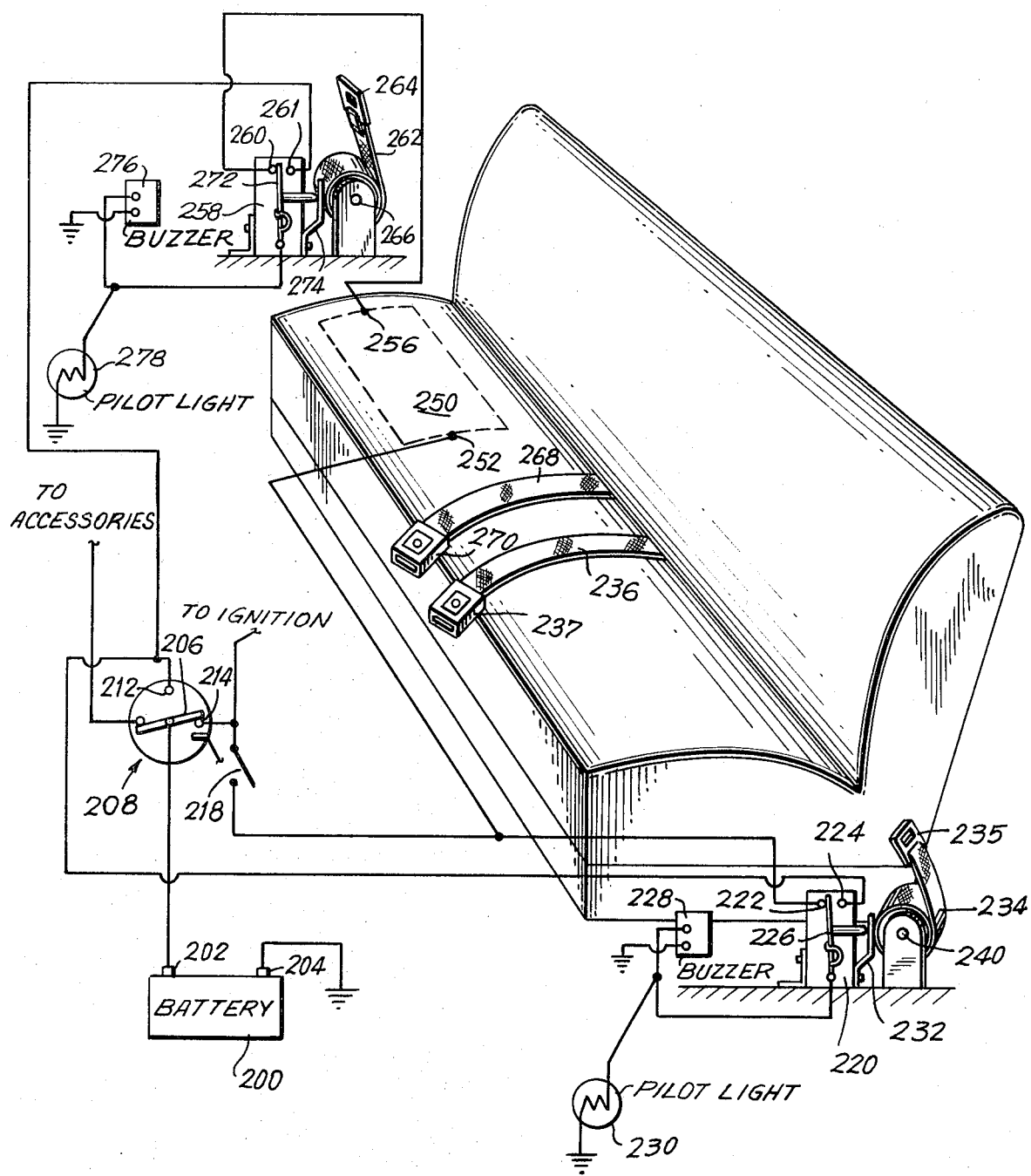
FIG. 4 is a schematic illustration of a third system.

In FIG. 4 of the drawings a further system of the present invention is shown and includes a vehicle battery 200. Vehicle battery 200 includes a hot terminal 202 and a further terminal 204 which is electrically coupled to the circuit ground. Terminal 202 is connected to a movable contact arm 206 of ignition switch 208. Ignition switch 208 is identical to the ignition switches previously described and in order to avoid needless repetition a description of ignition switch 208 is not set forth herein.

A shift member sensing switch 218 identical to the shift member sensing switches previously described is electrically connected to ignition on terminal 214 of ignition switch 208. A switch means 220 identical to switch means 22, 118 and 140 includes terminals 222 and 224 with terminal 222 electrically connected to transmission shift member switch 218. Switch means 220 includes a movable arm 226 which is biased against terminal 224 and is in circuit with one terminal of a warning device 228. The remaining terminal of warning device 228 is connected to circuit ground. Also electrically connected to movable arm 226 is a dashboard pilot light 230 which is connected to circuit ground. A cantilever switch leaf 232 is provided for abutting the push button of switch means 220 and controlling the position of movable arm 226. Terminal 224 is connected to switch off terminal 212.

A retractable seat belt 234 is provided for the driver side and includes a buckle half 235. A fixed belt 236 is provided for mating with retractable seat belt 234 and includes a buckle half 237. A spiral 240 is formed by the retraction of the belt 234. A sufficient amount of retraction of the belt causes the spiral to abut the cantilever switch leaf 232 and swing movable arm 226 into contact with terminal 222 in the same manner that the switch means previously described operate.

Located on the passenger side in the front seat of the vehicle is a normally open load sensitive momentary switch 250 having terminals 252 and 256. Terminal 252 is connected to terminal 222 of switch means 220. Terminal 256 makes electrical contact with terminal 252 upon a person sitting in the passenger side of the front seat of the vehicle so that load sensitive switch 250 is closed.

A snap action switch means 258 is provided which is identical to switch means 226, 118, 140 and 22. Switch means 258 includes terminals 260 and 261 with terminal 260 electrically connected to terminal 256. A retractable seat belt 262 having a buckle half 264 is provided for a person sitting in the passenger side of the front seat and a spiral 266 is formed by retraction of retractable belt 262. A stationary seat belt 268 having a buckle half 270 is provided to mate with retractable belt 262.

Switch means 258 includes a movable arm 272 which is biased against terminal 261 of switch means 258. Terminal 261 is connected to switch off terminal 212 of ignition switch 208. A cantilever switch leaf 274, identical to the cantilever switch leaves previously described, controls the position of movable arm 272. When belt 262 is fully retracted spiral 266 abuts cantilever switch leaf 274 and causes movable arm 272 to contact terminal 260. When seat belt 262 is extended, movable arm 272 contacts terminal 261.

A warning device 276 has one terminal connected to movable arm 272 and the other terminal connected to circuit ground. In parallel with the terminal of warning device 276 electrically connected to movable arm 272 is a pilot light 278 which is also connected to circuit ground.

With the ignition switch movable arm at the switch off position, if a person is sitting on the passenger side of the front seat load sensitive switch 250 is closed so that terminals 252 and 256 are in circuit with each other. If the seat belt is extended, movable arm 272 contacts terminal 261 and pilot 278 and warning device 276 are activated. If seat belt 262 is retracted, movable arm 272 contacts terminal 260 and no electrical energy is supplied to warning device 276 and pilot light 278. With movable contact arm 206 of ignition switch 208 connected to switch off terminal 212 and seat belt 234 extended, movable arm 226 contacts terminal 224 and warning device 228 and pilot light 230 are activated. If seat belt 234 is retracted, movable arm 226 contacts terminal 222 and no electrical energy is supplied to warning device 228 and pilot light 230 so that the pilot light and warning device are not acitvated.

With switch 218 closed, if movable contact arm 206 is moved to contact ignition on terminal 214 with an occupant sitting on the passenger side of the front seat, switch 250 is closed, and if seat belt 262 is retracted, movable arm 272 contacts terminal 260 and electrical energy from battery 200 through movable contact arm 206, terminal 214, through load sensitive switch 250 and terminal 260 is supplied to pilot light 278 and warning device 276 activating the same. If the seat belt is extended, spiral 266 decreases in size and movable arm 272 contacts terminal 261 so that no electrical energy is supplied to warning device 276 and pilot light 278.

With switch 218 closed and if seat belt 234 is retracted, movable arm 226 contacts terminal 222 and electrical energy is supplied to pilot light 230 and warning device 228 activating the same. As soon as the seat belt is extended, movable arm 226 contacts terminal 224 and electrical energy is no longer supplied to pilot light 230 and warning device 228 so that there is no activation of the same.

Warning devices 228 and 276 preferably are buzzers having different audible characteristics, e.g., different pitches so that by listening to the sound of the warning device it becomes readily apparent whether the driver seat belt or the front seat passenger seat belt is in its correct mode for a given set of conditions. Pilot lights situated at different locations or of different colors can be provided for visually indicating whether the driver seat belt or the front seat passenger seat belt is not in its proper mode of operation for a given set of conditions.

If desired, the use of switch 218 can be eliminated and terminal 214 can be directly connected to terminal 222. A load sensitive switch for the driver may be in series with terminals 214 and 222 or between switch 218 and terminal 222.

Figure 5:
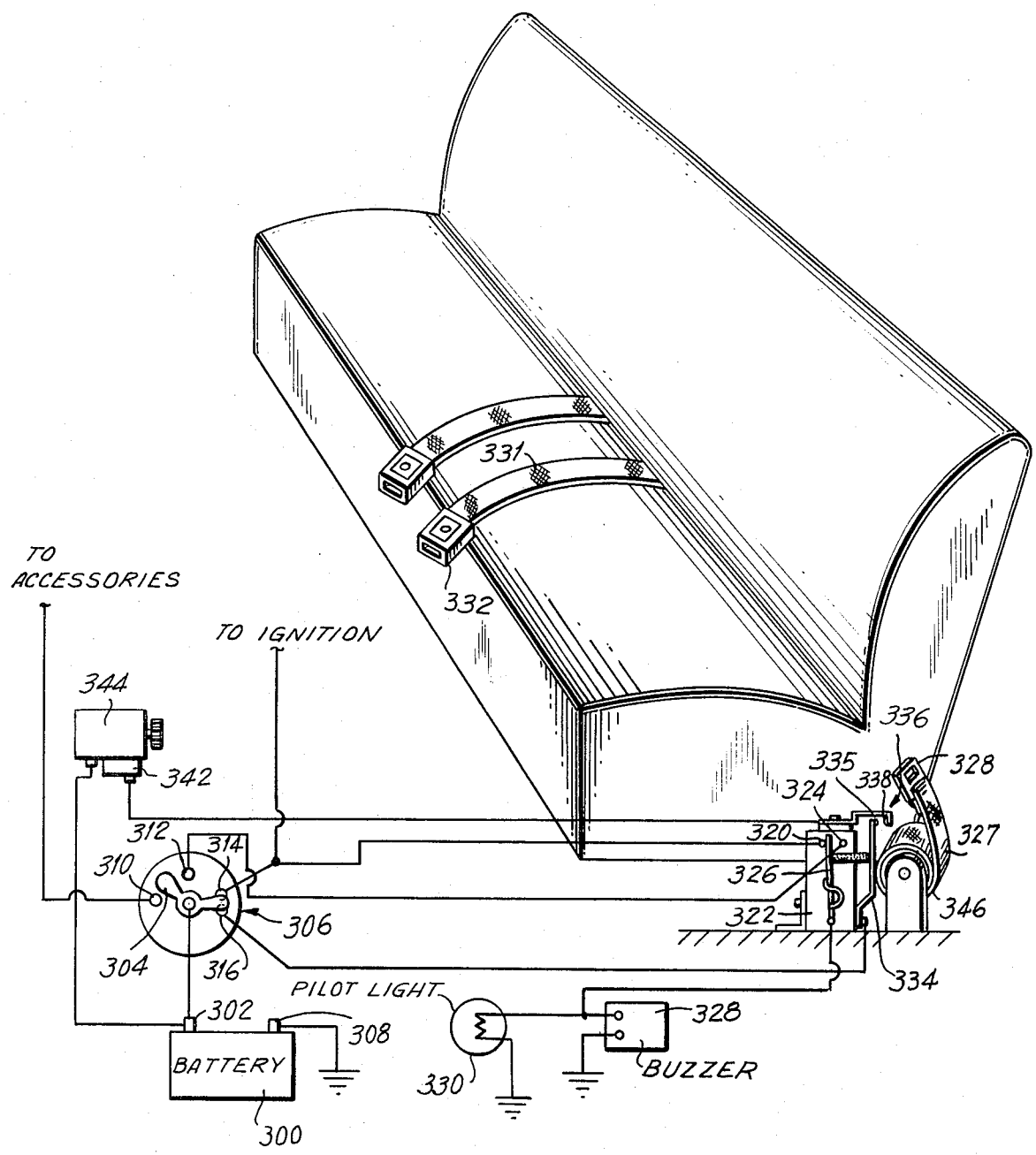
FIG. 5 is a schematic illustration of a fourth system.

In FIG. 5 of the drawings a vehicle seat belt starter motor interlock and sequential warning system is disclosed and includes a battery 300. The hot terminal 302 of battery 300 is connected to movable contact arm 304 of ignition switch 306. The remaining terminal 308 of battery 300 is connected to circuit ground. Ignition switch 306 includes an accessories on terminal 310, a switch off terminal 312 and ignition on terminal 314. Additionally, ignition switch 306 includes an engine cranking motor terminal 316. Ignition on terminal 314 is connected to terminal 320 of two terminal switch means 322. The second terminal 324 of two terminal switch means 322 is connected to switch off terminal 312. Switch means 322 includes a spring biased movable arm 326 which is electrically connected to one terminal of a warning device 328. The remaining terminal of warning device 328 is connected to circuit ground. Also connected to movable arm 326 is one terminal of a pilot light 330 with the other terminal thereof connected to circuit ground. Movable arm 326 is biased against terminal 324.

A retractable driver seat belt 327 having a buckle half 328 and a driver fixed belt 331 having a buckle half 332 is provided.

Engine cranking motor terminal 316 is connected to conducting cantilever switch leaf 334 of engine cranking motor control switch 336. Located at the upper end of cantilever switch leaf 334 is a switch terminal 335. Engine cranking motor control switch 43 336 further includes a fixed terminal 338 which is connected to a solenoid 342 for engine cranking motor 344. The engine cranking motor 344 is connected to the hot terminal of battery 300.

A spiral 346 is formed by the retraction of belt 327. Cantilever switch leaf 334 bears against spiral 346 and an insulated push button of switch means 322. When seat belt 327 is in its retracted position, the spiral maintains cantilever switch leaf 334 in a position so that terminal 335 is spaced from terminal 338 of engine cranking motor control switch 336 and so that the push button of switch means 322 causes movable arm 326 to contact terminal 320 of said switch means. When seat belt 327 is pulled or extended to a partially unretracted position, the size of spiral 346 decreases so that cantilever switch leaf 334 does not exert any pressure on the push button of switch means 322. The inherent bias of movable arm 326 causes the movable arm to make contact with terminal 324 of switch means 322 moving the push button so cantilever switch leaf 334 moves and terminal 335 makes contact with terminal 338. The point at which movable arm 326 is snapped against terminal 324 is selected by the vehicle manufacturer as previously described.

If movable arm 304 of ignition switch 306 is in contact with ignition switch off terminal 312 and seat belt 327 is extended, movable arm 326 of switch means 322 contacts terminal 324 and warning device 328 is activated and pilot light 330 is illuminated.

If seat belt 327 is retracted, spiral 346 causes cantilever switch leaf 334 to move so that terminal 335 is spaced from terminal 338 and movable arm 326 contacts terminal 320 of switch means 322. With the movable arm 326 in this position no electrical energy is supplied to warning device 328 and pilot light 330.

If movable arm 304 is moved to span ignition on terminal 314 and engine cranking motor terminal 316 with the seat belt retracted, movable arm 326 contacts terminal 320 and warning device 328 is activated and pilot light 330 is illuminated. Even though movable arm 304 is in contact with engine cranking motor terminal 316 the engine cranking motor 344 will not operate since with seat belt 327 retracted spiral 346 prevents terminal 335 of cantilever switch leaf 334 from contacting terminal 338 so that no electrical energy is directed to solenoid 342. If seat belt 327 is extended, movable arm 326 contacts terminal 324 and no electrical energy is supplied to warning device 328 and pilot light 330. Similarly, terminal 335 contacts terminal 338 and electrical energy is supplied to solenoid 342 closing the same so that the engine cranking motor operates and the engine is started. After the engine is started, a force is no longer applied to movable arm 304 of ignition switch 306 and the same under the influence of a spring acting thereon contacts only ignition on terminal 314 since it is no longer necessary to direct electrical energy to solenoid 342. Once the engine has started, it is immaterial whether seat belt 327 is extended or retracted insofar as the continued operation of the engine is concerned. However, extension or retraction of the seat belt as previously described in conjunction with the first embodiment of the present invention will activate warning device 328 and pilot light 330 depending whether arm 304 is in contact with switch off terminal 312 or ignition on terminal 314.

From the foregoing it is obvious that the engine cranking motor 344 cannot be supplied with electrical energy unless seat belt 327 is extended. Thus, an interlock system is provided with its inherent advantages. As described earlier, the seat belt warning system cannot be defeated by permanently extending seat belt 327 since when movable arm 304 is in contact with switch off terminal 312 warning device 328 is activated and pilot light 330 is illuminated.

It is to be appreciated that while no shift member sensing switch is provided that if desired one could be utilized. Also, if desired, a load sensitive switch could be provided for the driver as disclosed in the system shown in FIGS. 1 and 2.

Figure 6:
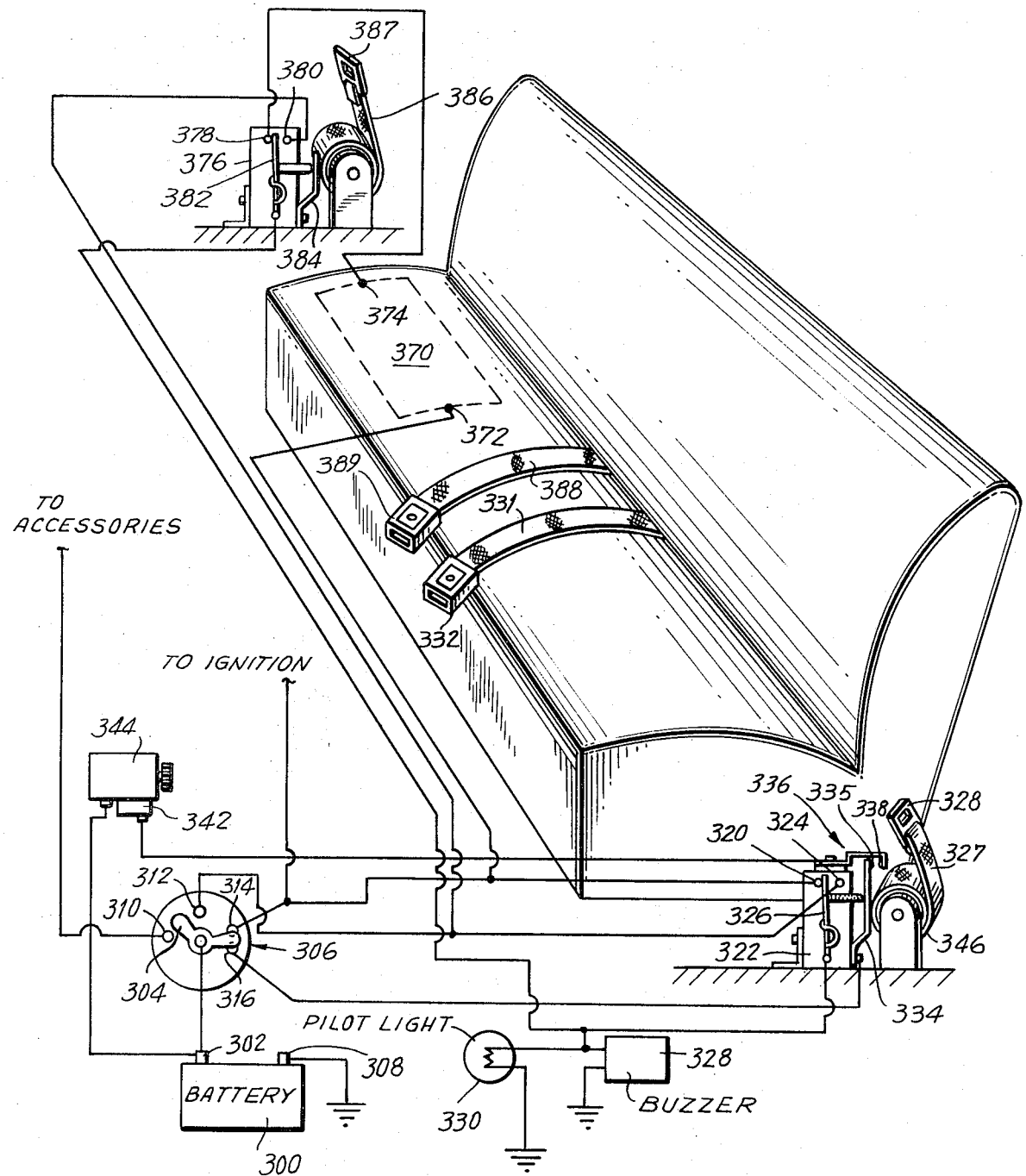
FIG. 6 is a schematic illustration of a fifth system.

In FIG. 6 of the drawings a vehicle seat belt starter motor interlock and sequential warning system is disclosed which is identical to the system disclosed in FIG. 5 except that means is provided for activating the warning device and illuminating the pilot light when the passenger seat belt is extended if the movable arm of the ignition switch is in contact with the switch off terminal or if the passenger seat belt is retracted and the movable arm of the ignition switch is in contact with the ignition on terminal. Like parts in FIGS. 5 and 6 are identified by the same reference numeral and in the interest of brevity a description of the common subject matter of FIGS. 5 and 6 has been eliminated.

The passenger seat belt warning system is the same as that shown in FIG. 3 and includes a normally open load sensitive momentary switch 370 located on the passenger side of the front vehicle seat and which includes terminals 372 and 374. Terminal 372 is connected to terminal 320 of switch means 322. A passenger side switch means 376 identical to switch means 22, 118, 140, 220 and 258 is provided and includes fixed terminals 378 and 380. Terminal 374 of load sensitive switch 370 is connected to terminal 378 of switch means 376. Switch means 376 includes a movable arm 382 which is biased against terminal 380. A cantilever switch leaf 384 identical to cantilever switch leaves 56, 128, 148, 232 and 274 is provided and moves movable arm 382. A retractable seat belt 386 including a buckle half 387 is provided for the passenger on the front seat as is a fixed belt 388 including a buckle half 389. The structure for controlling operation of switch means 376 in respect to extension or retraction of belt 386 is identical to that in connection with controlling switch means 22, 118, 148, 220 and 258. Movable arm 382 of switch means 376 is electrically connected to movable arm 326 of switch means 322. Terminal 380 is electrically connected to switch off terminal 312.

As the interlock means of the system shown in FIG. 6 is identical to that shown in FIG. 5 and as the warning system for the driver is identical to that shown in FIG. 5 and the warning system for the passenger is the same as for the passenger shown in FIG. 3, a description of the operation of the FIG. 6 system is unnecessary and in the interest of brevity one is not set forth herein.

In this system a shift member sensing switch could be utilized if desired as disclosed in conjunction with the FIG. 3 system.

The system shown in FIG. 6 can be modified to include separate warning means for the passenger and driver seat belt assemblies as shown in FIG. 4.

The lock and key segment of the ignition switch is not shown herein since it is well known in the art.

A time delay bypass switch may be incorporated for convenience to enable the vehicle engine to be started without the seat belt being extended.

A timer may be used to shut off the warning devices disclosed herein after a predetermined amount of activation thereof.

It thus will be seen that there is provided a vehicle seat belt starter motor interlock and sequential warning system which is well adapted to meet the conditions of practical use.

As various possible embodiments might be made of the above invention, and as various changes might be made in the embodiment above set forth, it is to be understood that all matter herein described or shown in the accompanying drawings is to be interpreted as illustrative and not in a limiting sense.

Having thus described the present invention, there is claimed as new and desired to be secured by Letters Patent:

1. A vehicle seat belt warning system comprising a source of electrical power, an ignition switch including an ignition on contact terminal and a switch off contact terminal, means operated by an ignition key for electrically connecting said source of power selectively to said ignition on contact terminal and to said ignition off contact terminal, a first seat belt assembly including a first retractable belt, a warning device, and means for activating said warning device when said source of power is electrically connected to the switch off contact terminal and said first retractable belt is unretracted and for deactivating said warning device when said first retractable belt is retracted when said source of electrical power is connected to said switch off contact terminal and for activating said warning device when said source of electrical power is connected to said switch on contact terminal and said first retractable belt is retracted and for deactivating said warning device when said source of electrical power is connected to the switch on contact terminal and the first retractable belt is unretracted.

2. A warning system according to claim 1 wherein said activating and deactivating means further includes means for sensing when said first retractable belt is retracted, and switch means for electrically connecting the switch off contact terminal of said ignition switch to said warning device when said sensing means detects that said first retractable belt is unretracted, and for electrically disconnecting the switch off contact terminal of said ignition switch from said warning device when said sensing means detects the retraction of said first retractable belt.

3. A warning system according to claim 2 wherein said switch means includes a fixed contact terminal electrically connected to the switch off contact terminal of said ignition switch, and a movable contact arm electrically connected to said warning device, the movable arm of said switch means being spring biased so as to be electrically connected to the fixed contact terminal of said switch means when said first retractable belt is unretracted.

4. A warning system according to claim 3 wherein said sensing means further includes a spiral formed by the retraction of said first retractable belt, and a switch control element placed adjacent said spiral and the movable arm of said switch means being operable by said switch control element, whereby upon retraction of said first retractable belt said spiral increases in size so as to force said switch control element to move the movable arm of said switch means away from the fixed contact terminal and upon moving of said first retractable belt, so as to be unretracted, said spiral decreases in size which allows the movable arm of said switch means to electrically contact the fixed contact terminal and activate said warning device with the electrical source coupled to said switch off terminal.

5. A warning system according to claim 3 wherein said switch means further includes another fixed contact terminal so positioned as to be electrically connected to the movable arm of said switch means when said first retractable belt is retracted and to be electrically disconnected from the movable arm of said switch means when said first retractable belt is unretracted, a load sensitive switch placed within a seat of the vehicle, said load sensitive switch being closed when an occupant is sitting on the seat and said load sensitive switch being open when the seat is unoccupied, one terminal of said load sensitive switch being connected with the ignition on contact terminal of said ignition switch, and the other terminal of said load sensitive switch being electrically coupled to the another fixed contact terminal of said switch means, whereby when said load sensitive switch is closed and said source of power is electrically connected to the ignition on contact terminal, said warning device becomes activated if said first retractable belt is retracted and said warning device becomes deactivated upon moving said first retractable belt so as to be unretracted.

6. A warning system according to claim 5 further including a shift member sensing switch in series with said ignition on contact terminal of said ignition switch and said load sensitive switch.

7. A vehicle seat belt warning system according to claim 1 further including a second seat belt assembly, said second seat belt assembly including a second retractable belt for use by a passenger sitting on the front seat of a motor vehicle, said first seat belt assembly for use by the driver of a motor vehicle, said activating means including means for activating said warning means when said source of power is electrically connected to the switch off contact terminal and said second retractable belt is extended and for activating said warning device when said second retractable belt is retracted and said source of electrical power is connected to said switch on contact terminal.

8. A vehicle seat belt warning system according to claim 7 wherein said activating means includes first sensing means for sensing when said first retractable belt is retracted and unretracted, first switch means for electrically connecting the switch off contact terminal of said ignition switch to said warning means when said first sensing means detects said first retractable belt being retracted and for electrically disconnecting the switch off contact terminal of said ignition switch from said warning means when said first sensing means detects the retraction of said first retractable belt, second sensing means for sensing when said second retractable belt is retracted, second switch means for electrically connecting the switch off contact terminal of said ignition switch to said warning means when said second sensing means detects that said second retractable belt is unretracted and electrically disconnecting the switch off contact terminal of said ignition switch from said warning means when said second sensing means detects the retraction of said second retractable belt.

9. A vehicle seat belt warning system according to claim 1 further including an engine cranking motor contact terminal, an engine cranking motor solenoid, means for connecting said engine cranking motor terminal to said engine cranking motor solenoid when said first retractable belt is unretracted and for disconnecting said engine cranking motor terminal from said engine cranking motor solenoid when said first retractable belt is retracted.

* * * * *